(12) United States Patent  
Joslyn et al.

(10) Patent No.: US 8,460,140 B2  
(45) Date of Patent: Jun. 11, 2013

(54) BELT TENSIONER UTILIZING ASYMMETRIC MOTION CONTROL

(75) Inventors: Robert C. Joslyn, Christian County, MO (US); James G. Quintus, Springfield, MO (US); Randy C. Foster, Strafford, MO (US)

(73) Assignee: Dayco IP Holdings, LLC, Springfield, MO (US)

( * ) Notice: Subject to any disclaimer, the term of this patent is extended or adjusted under 35 U.S.C. 154(b) by 2224 days.

(21) Appl. No.: 11/284,809

(22) Filed: Nov. 22, 2005

(65) Prior Publication Data  
US 2007/0142148 A1 Jun. 21, 2007

(51) Int. Cl.  
*F16H 7/12* (2006.01)

(52) U.S. Cl.  
USPC ............. 474/136; 474/91; 474/101; 474/109; 474/112; 474/133; 474/135; 192/48.3; 192/48.5; 192/75; 192/76; 192/105 CD; 267/166; 267/167

(58) Field of Classification Search  
USPC .................. 474/136, 113, 101, 133; 192/48.5  
IPC ......................................................... F16H 7/12  
See application file for complete search history.

(56) References Cited

U.S. PATENT DOCUMENTS

| | | | | |
|---|---|---|---|---|
| 3,768,611 A | * | 10/1973 | Frederickson | 192/105 BA |
| 5,470,280 A | * | 11/1995 | Ayukawa | 474/135 |
| 5,503,261 A | * | 4/1996 | Schultz | 192/105 CD |
| 6,000,519 A | * | 12/1999 | Becker et al. | 192/105 CD |
| 6,231,465 B1 | * | 5/2001 | Quintus | 474/133 |
| 6,609,600 B1 | * | 8/2003 | Shen | 192/48.5 |
| 2003/0119615 A1 | | 6/2003 | Meckstroth et al. | |
| 2003/0119616 A1 | | 6/2003 | Meckstroth et al. | |
| 2004/0185976 A1 | | 9/2004 | Meckstroth et al. | |

FOREIGN PATENT DOCUMENTS

JP 07238966 A * 9/1995

* cited by examiner

*Primary Examiner* — Robert A Siconolfi  
*Assistant Examiner* — San Aung  
(74) *Attorney, Agent, or Firm* — Thompson Hine LLP

(57) ABSTRACT

A belt tensioner includes a support housing at least in part defining a spring cavity and an arm pivotally attached to the support housing. A spring is located in the spring cavity and is operatively connected to the arm and the support housing to bias the arm about a pivot axis toward an unloaded position relative to the support housing. A damping member includes a hub and deflectable, force-applying elements that are connected to and spaced apart about a periphery of the hub. The force-applying elements are biased toward a contact surface of the arm to apply a frictional force between the contact surface and the force-applying elements to impede rotation of the arm relative to the support housing.

25 Claims, 6 Drawing Sheets

BELT TENSIONER UTILIZING ASYMMETRIC MOTION CONTROL

TECHNICAL FIELD

The present application relates generally to belt tensioners and more particularly to a belt tensioner that utilizes asymmetric motion control.

BACKGROUND

It is known to drive various automobile accessory assemblies, for example the water pump, the generator, the fan for cooling the coolant, the power steering pump, and the compressor, by the vehicle engine. This is done by a driving pulley actuated by the engine shaft of the motor vehicle which drives an endless drive belt operating the accessory assemblies through driven pulleys.

In many of these automotive accessory drives, it is desirable to control belt tension. To this end, numerous structures of belt tensioners have been proposed which provide such tension control. These include asymmetric tensioners where the friction force and dissipated vibration energy is significantly higher during a tensioner loading cycle than those during a tensioner unloading cycle.

SUMMARY

In an aspect, the invention features a belt tensioner that includes a support housing at least in part defining a spring cavity and an arm pivotally attached to the support housing. A spring is located in the spring cavity and is operatively connected to the arm and the support housing to bias the arm about a pivot axis toward an unloaded position relative to the support housing. A damping member includes a hub and deflectable, force-applying elements that are connected to and spaced apart about a periphery of the hub. The force-applying elements are biased toward a contact surface of the arm to apply a frictional force between the contact surface and the force-applying elements to impede rotation of the arm relative to the support housing.

In another aspect, the invention features a belt tensioner including a support housing at least in part defining a spring cavity and an arm pivotally attached to the support housing. A spring is located in the spring cavity and is operatively connected to the arm and the support housing to bias the arm about a pivot axis toward an unloaded position relative to the support housing. A damping member includes an annular hub and a discontinuous curve portion that includes an array of force-applying elements disposed about a periphery of the damping member. The force-applying elements have a free end biased toward a contact surface of the arm such that a friction surface of the force-applying elements contacts the contact surface to impede rotation of the arm relative of the support housing.

In another aspect, the invention features a method of forming a belt tensioner that utilizes asymmetric motion control and includes a support housing at least in part defining a spring cavity, an arm pivotally attached to the support housing and a spring located in the spring cavity and operatively connected to the arm and the support housing to bias the arm about a pivot axis toward an unloaded position relative to the support housing. The method includes locating a damping member within a compartment of the arm. The damping member includes an annular hub and deflectable, force-applying elements that are connected to and spaced apart about a periphery of the annular hub. The force-applying elements are biased toward a contact surface of the arm to apply a frictional force between the contact surface and the force-applying elements to impede rotation of the arm relative to the support housing. An angular position of the damping member is fixed relative to the support housing.

Other advantages and features of the invention will be apparent from the following description of particular embodiments and from the claims.

DETAILED DESCRIPTION

Figure 1:
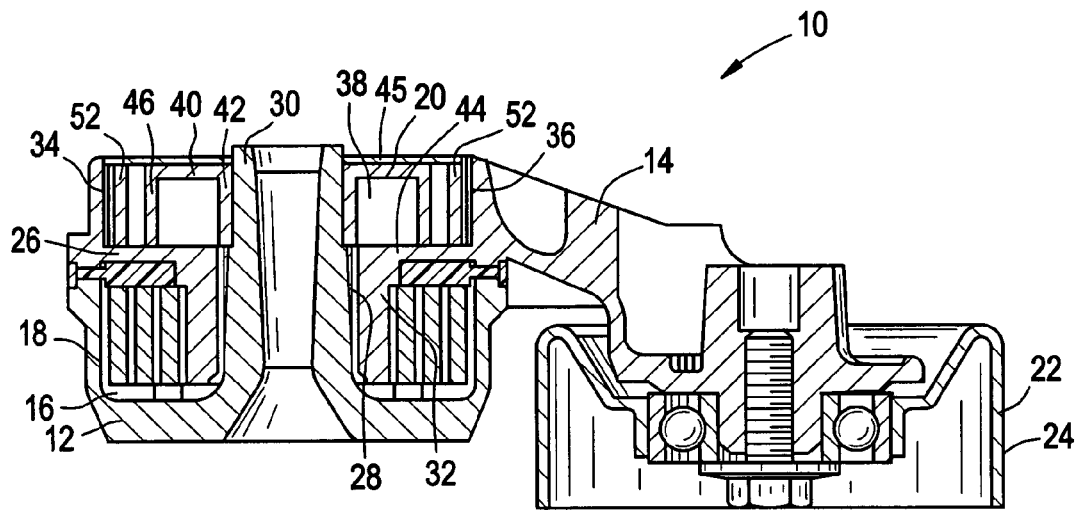
FIG. 1 is a section view of an embodiment of a belt tensioner including an embodiment of a biasing member.
Figure 2:
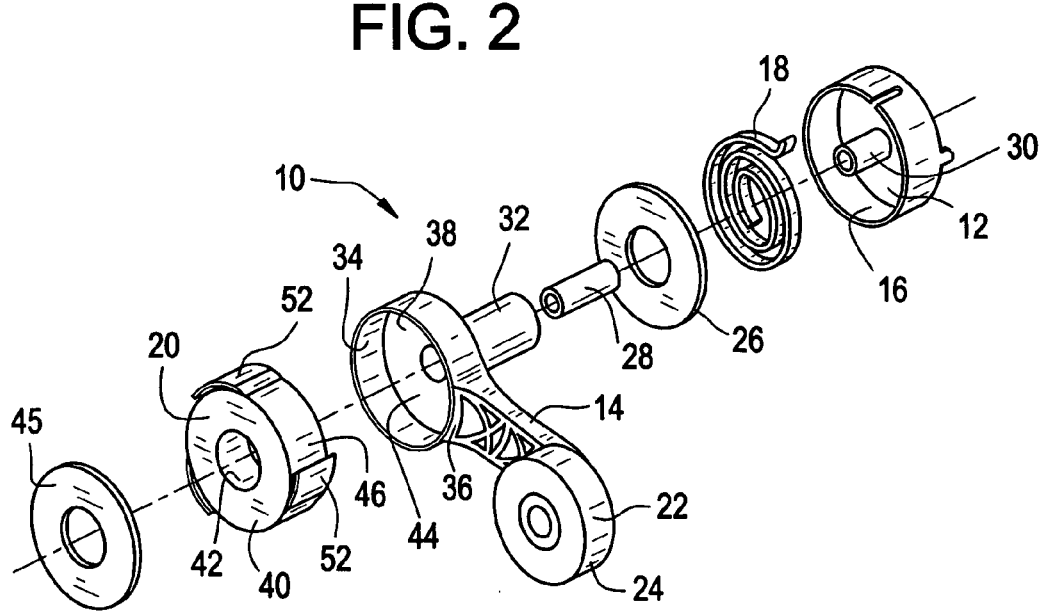
FIG. 2 is an exploded view of the belt tensioner of FIG. 1.

Referring to FIGS. 1 and 2, a belt tensioner 10 includes a support housing 12 and a pivot arm 14 that is rotatably mounted to the support housing, forming a spring cavity 16 therebetween. A flat wire spring 18 is located within the spring cavity 16 and operatively connected to both the pivot arm 14 and the support housing 12. Spring 18 applies a biasing force to the pivot arm 14 to bias the pivot arm toward an unloaded position. As will be described in detail below, a damping member 20 provides asymmetrical damping of pivot arm movement relative to the support housing 12 through use of multiple force-applying elements 52 disposed at spaced-apart locations about a periphery of the damping member 20.

Pivot arm 14 carries a pulley 22, such as a front or backside idler pulley, that can rotate relative to the pivot arm. The pulley 22 has a belt-engaging surface 24 for engaging a belt, such as an automotive transmission belt. A bushing 26 is located between the spring 18 and pivot arm 14 to provide enhanced wear resistance, a desirable friction surface between the pivot arm and the spring case and a seal that can inhibit contaminants from entering the spring cavity 16. A pivot bushing 28 is provided between a pivot shaft 30 carried by the support housing and a hub 32 of the pivot arm 14 for use in accurately aligning the assembly. Additional details of certain tensioner features can be found in U.S. Pat. No. 5,443,424 to Henderson, the content of which is hereby incorporated by reference as if fully set forth herein. While flat wire spring 18 is depicted, in some embodiments, a round wire spring may be used for applying the biasing force to the pivot arm 14.

An upper, annular flange 34 and raised surface 36 of pivot arm 14 form an upper compartment 38 into which shaft 30 of the support housing extends. Fixedly connected to the shaft 30 (e.g., by swaging) is damping member 20. Damping member 20 is fixedly located by the shaft 30 with the pivot arm 14 being capable of rotating relative to the damping member.

Damping member 20 includes a hub 40 and an inner shoulder 42 extending downwardly from the hub. The inner shoulder 42 may or may not contact a surface 44 of the pivot arm 14. In some embodiments, an outer shoulder 46 of the damping member 20 may or may not contact surface 44. Alternatively, in some embodiments, hub 40 may contact surface 44 with inner and outer shoulders 42, 46 facing upwardly toward dust cover 45. The damping member 20 may contact the surface 44, for example, to provide axial surface damping, e.g., for high damping applications. The dust cover 45 inhibits contaminants from entering upper compartment 38. In certain embodiments, a fastener (not shown), such as a bolt, applies a compressive force that is used to constrain and align the tensioner assembly.

Figure 3:
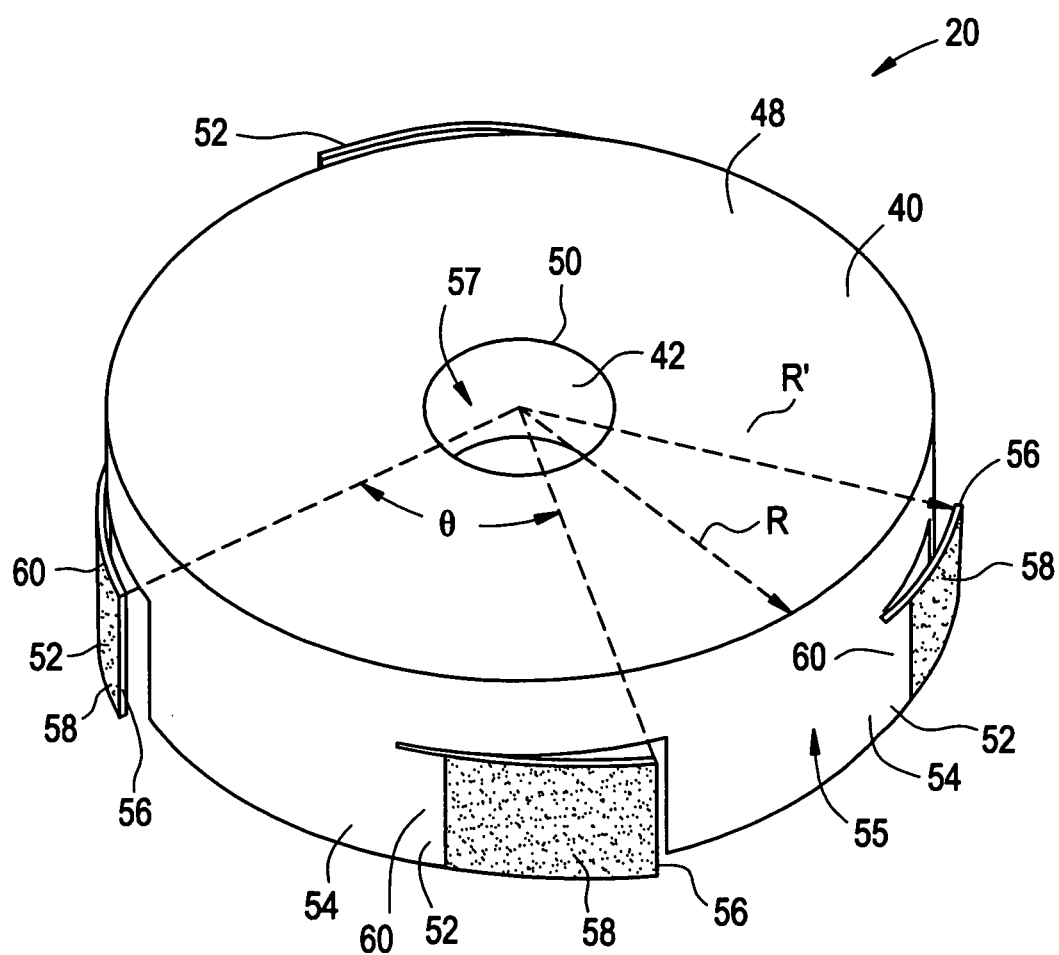
FIG. 3 is a perspective view of an embodiment of a biasing member for use in the belt tensioner of FIG. 1.

Referring now to FIG. 3, damping member 20 includes the rounded or annular hub 40 having a planar upper surface 48 and an opening 50 extending therethrough to a bore 57 that is formed by the inner shoulder 42 extending outwardly from the hub. In an alternative embodiment, there may be an opening 50 that extends through the upper surface 48 of the hub 40 without the inner shoulder 42 forming the bore 57.

Located about a periphery of the hub 40 are force-applying elements 52. In the illustrated embodiment, each force-applying element 52 is in the form of a leaf that is attached to the hub 40 at one end 54 and extends to a free end 56. The force-applying elements 52 together define a discontinuous curve portion 55 that extends about the periphery of the damping member 20. The force-applying elements 52 are each shaped such that, in some embodiments, the free ends 56 extend radially outwardly beyond the periphery of the hub 40 in their respective free states providing a radius R' that is greater than a radius R of the hub. Ends 54 form a pivot location about which the force-applying elements 52 can rotate. In some embodiments, the pivot locations are equally spaced apart about the periphery of the hub 40.

While the force-applying elements 52 are shown as having substantially the same length and curvature, at least some of the force-applying elements 52 may have differing lengths and/or curvatures. For example, only opposing force-applying elements 52 may have substantially the same length and/or curvature.

In some embodiments, the angular position of the free ends 56 are equidistant from each other about the periphery of the hub 40. For example, the illustrated embodiment includes five force-applying elements 52 with free ends 56 being spaced-apart an angle θ of about 72 degrees from each other. In some embodiments, damping member 20 may include less than five force-applying elements 52, such as two force-applying elements (e.g., having ends 56 spaced-apart about 180 degrees from each other) or more, three force-applying elements (e.g., having ends 56 spaced-apart about 120 degrees from each other) or more, four force-applying elements (e.g., having ends 56 spaced-apart about 90 degrees from each other) or more. In some embodiments, damping member 20 may include more than five force-applying elements.

Each force-applying element 52 is formed of an elastically deflectable material, such as a medium carbon steel (e.g., 1040 carbon steel, 1045 carbon steel and the like). In some embodiments, such as that shown by FIG. 3, the force-applying elements 52 are formed integrally of the same material such as the same piece of material forming the hub 40.

A relatively high friction material 58 is affixed to an outer surface 60 of each force-applying element 52. The high friction material 58 has a higher coefficient of friction than that of material forming outer surface 60. In some embodiments, the high friction material 58 extends from the free end 56 of each force applying element 52 and along only a portion of a length of the force-applying element. Alternatively, the high friction material 58 may extend the entire length of the force-applying element and, in some implementations, about substantially the entire periphery of the hub 40. In some embodiments, the high friction material 58 may not extend from the end 56 and may be offset a distance from the free end of the force-applying element. While free ends 56 are shown as substantially squared, they may be other suitable shapes, such as rounded.

The high friction material 58 may be affixed by any suitable method, such as by coating or by attaching a strip of high friction material to the outer surface 60, for example, using an intermediate bonding material (e.g., an adhesive). Any suitable high friction material may be used including those materials and composites used to form brake pads, such as high density polyethylene, rubber, graphite based materials, nylon 6/3, etc., which may or may not include fillers such as glass or carbon fibers.

Figure 4:
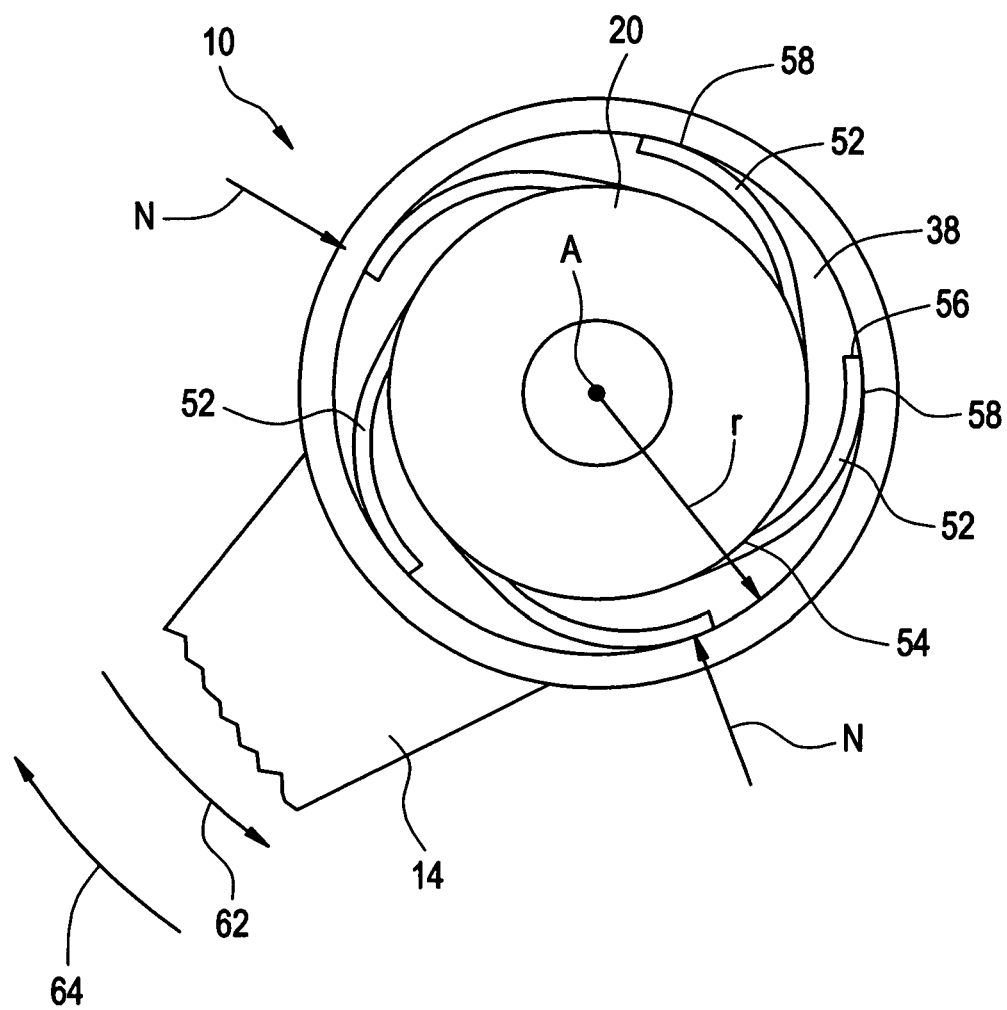
FIG. 4 is a partial, sectional view of the belt tensioner of FIG. 1 showing the biasing member of FIG. 3 in a preloaded state.

Referring now to FIG. 4, tensioner 10 is shown with the dust cover 45 removed and the damping member 20 located in the compartment 38. Compartment 38 has an inner radius r that is less than R' of the damping member 20 in the unloaded state. As a result, the force-applying elements 52 are deflected (i.e., preloaded) radially inwardly toward pivot axis A upon locating the damping member 20 in the compartment 38. Due at least in part to elastic properties of the material forming the force-applying elements 52 and the amount of their deflection creating a tendency for the force-applying elements to attempt to spring back toward their free states, the force-applying elements 52 apply an outward, somewhat radial force over an area of the inner surface of the compartment 38. A normal force N is applied to each force-applying element 52 that opposes the radial force.

As pivot arm 14 rotates away from ends 54 about A in the direction of arrow 62, N may be relatively constant and a relatively constant damping force may be applied by the damping member 20 to dampen movement of the pivot arm. In some embodiments, movement of the pivot arm 14 in the direction of arrow 62 is in a direction toward a power transmission belt, which may also correspond to a spring 18 unwinding direction. As pivot arm 14 rotates toward ends 54 about A in the direction of arrow 64 (i.e., in a self-energizing direction), N may increase depending at least in part on the geometry of the force-applying elements 52 and the friction material 58. In some embodiments, movement of the pivot arm 14 in the direction of arrow 64 is in a direction away from a power transmission belt, which may also correspond to a spring 18 winding direction. An increase in N increases the damping friction applied to the pivot arm 14 resulting in asymmetry in the amount of damping of pivot arm movement depending on the direction of pivot arm rotation. In some embodiments, the damping member 20 may be formed so as to prevent or stop rotation of the pivot arm 14 with the pivot arm rotating in the direction of arrow 64, for example, through selection of element 52 geometry, number of force-applying elements 52, material forming the damping member, the friction material 58, and the like.

Damping member 20 may be formed by any suitable method such as by stamping, bending, drawing and/or cutting, as examples. Suitable cutting methods may include electro discharge machining, laser cutting, grinding, water jet cutting, etc.

Figure 5:
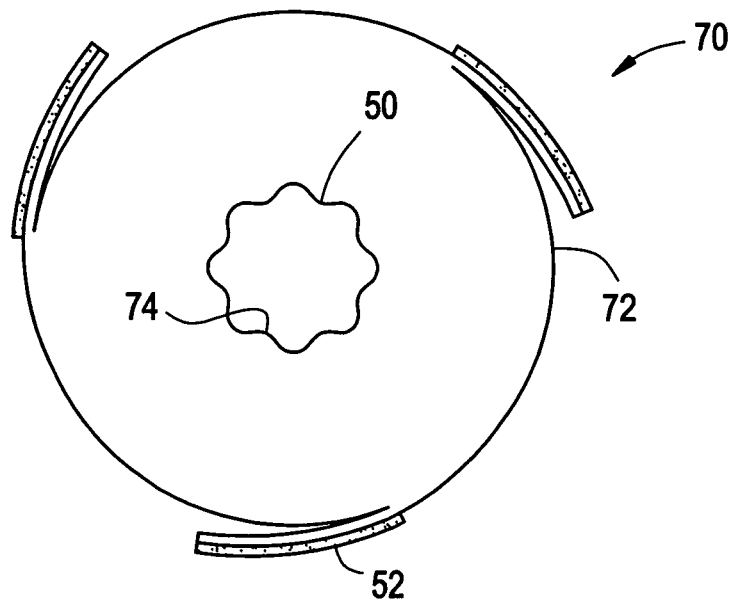
FIG. 5 is a top view of another embodiment of a damping member.
Figure 6:
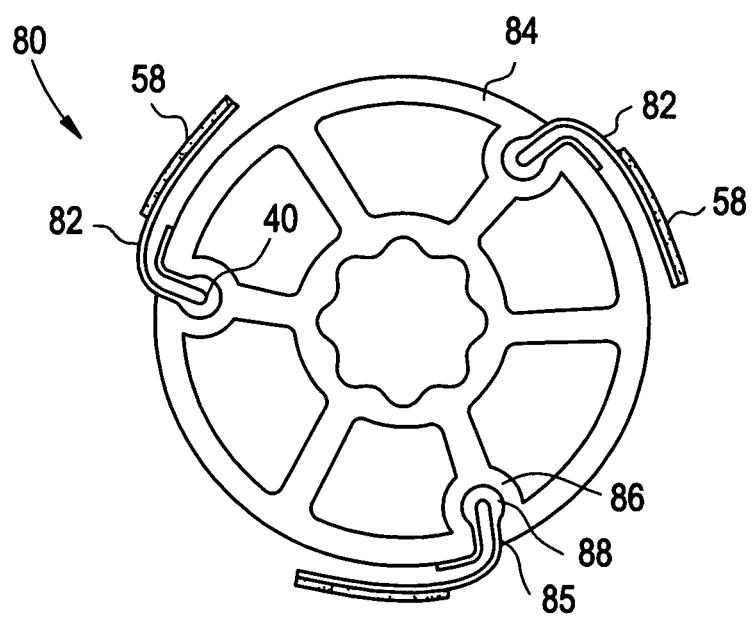
FIG. 6 is a top view of another embodiment of a damping member.

Referring now to FIGS. 5-9 other damping member embodiments are illustrated. Referring to FIG. 5, damping member 70 includes three force-applying elements 52 spaced apart about the periphery of the damping member defining a discontinuous curve portion 72. Strips of friction material 58 are affixed to outer surfaces of the force-applying elements 52. Opening 50 includes a locking feature 74 that can be used to interlock the damping member 70 and the pivot shaft 30 (FIG. 2) to prevent pivoting of the damping member relative to the support housing 20. Referring to FIG. 6, damping member 80 includes separately formed force-applying elements 82 that are mounted to a preformed hub 84. The hub 84 and force-applying elements 82 include corresponding interlocking structures 86 and 88 that are used to mate a fixed portion 85 of the force-applying elements with the hub. In some embodiments, hub 84 may be formed by extrusion or through use of powder metallurgy. The force-applying elements 82 may be formed of a material different from the material forming the hub 84.

Figure 7:
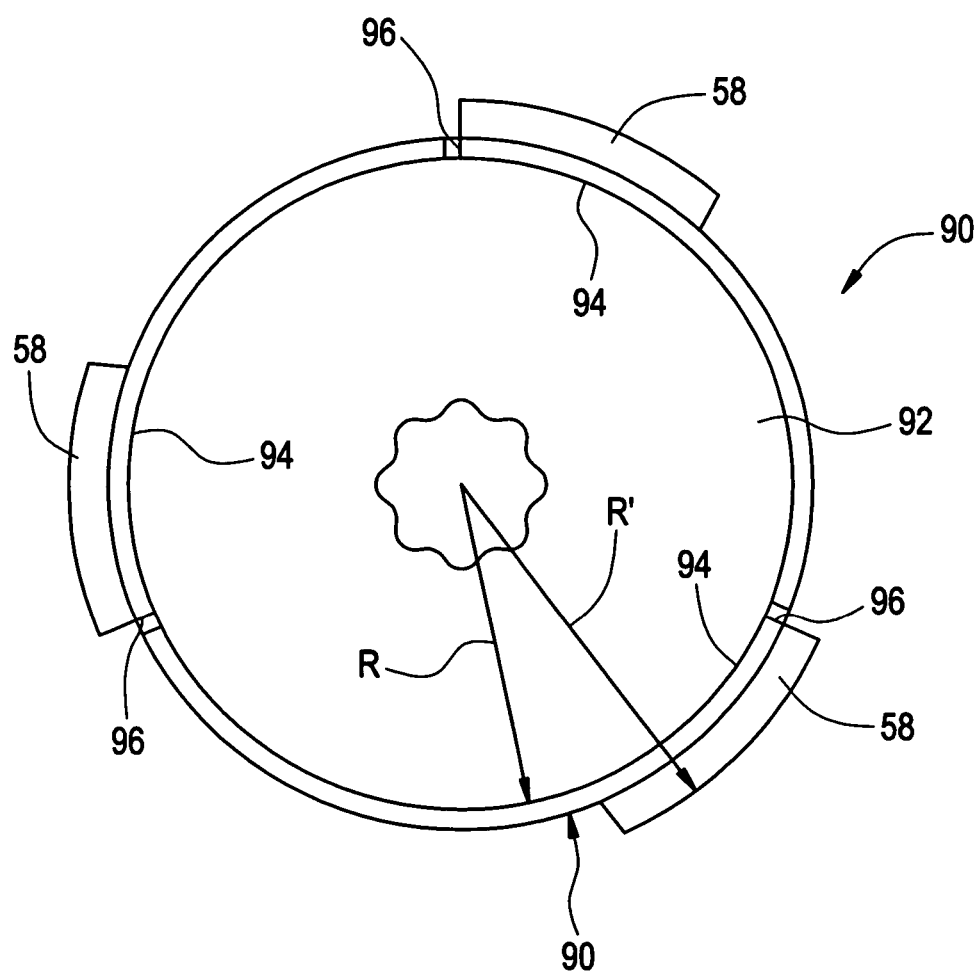
FIG. 7 is a bottom view of another embodiment of a damping member.

Referring now to FIG. 7, damping member 90 utilizes thicknesses of the friction material 58 to provide radius R' that is greater than R of hub 92. In this embodiment, the force applying elements 94 include free ends 96 that form a discontinuous curve portion 98 about a periphery of the damping member 90. In certain embodiments, the free ends 96 are substantially aligned with R with the damping member 92 in its unloaded position. When positioned within compartment 38 having radius r (see FIG. 4), the force-applying elements 94 deflect inwardly such that a distance from the center of the damping member 90 to the free ends 96 is less than R.

Figure 8:
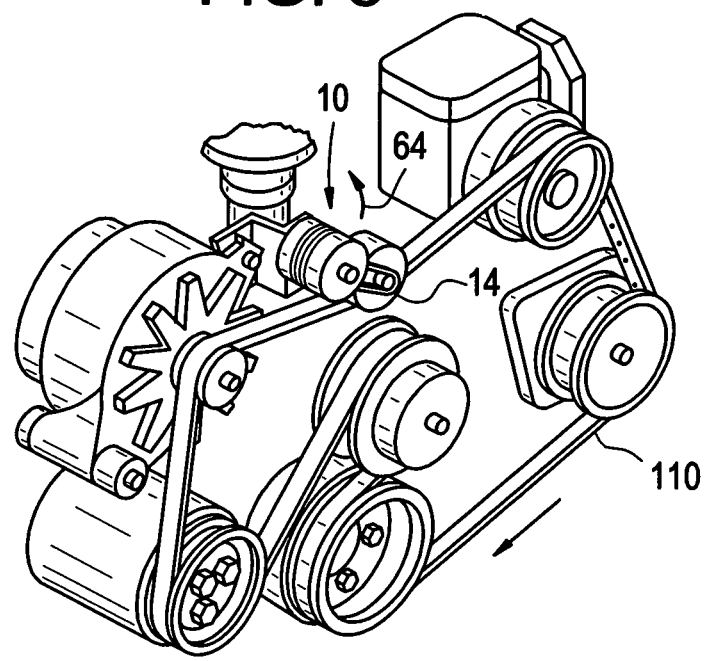
FIG. 8 is a illustrative perspective view of an embodiment of an engine including the belt tensioner of FIG. 1.
Figure 9:
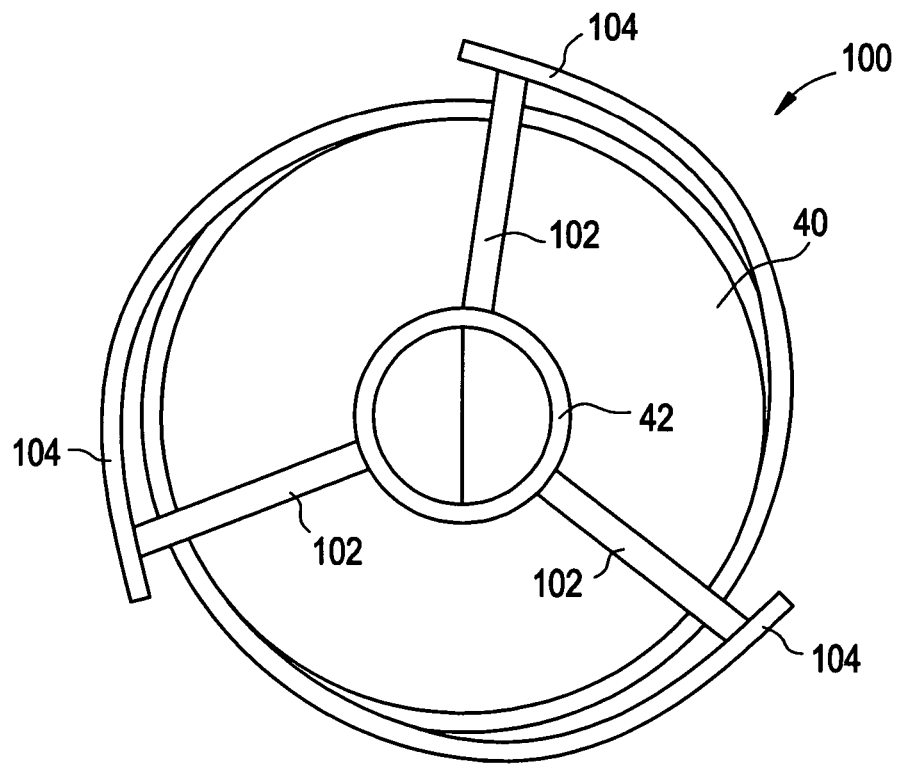
FIG. 9 is a bottom view of another embodiment of a damping member including biasing elements.

Use of the above-described damping members can provide a belt tensioner having asymmetric motion control. Referring to FIG. 8, when arm 14 of tensioner 10 travels in a direction away from power transmission belt 110, e.g., in direction 64, a dynamic event occurs that attempts to lift the tensioner 10 with the belt 110. This may result in a reverse tension between the belt 110 and the tensioner of about 300 pounds force or more. Such an event can be a result of the unloading of an accessory, a rapid engine deceleration, and the like, as examples. During this event, it may be desirable for the tensioner 10 to resist this motion with a greater torque than is normally provided by spring 18. This greater torque may be provided through use of a damping member, such as those damping members described above.

In some embodiments, the force-applying elements are integrally formed of the same material forming the hub and need not be separately attached thereto. Such integrally formed embodiments may provide an increased damping member lifespan, for example, compared to damping member designs formed of separately constructed, interconnected parts and may reduce manufacturing costs. In certain embodiments, by spacing the force-applying elements equally about the periphery of the hub, the damping member applies a substantially symmetric radial force about the pivot axis A against the pivot arm, which can improve tensioner alignment during use.

A number of detailed embodiments have been described. Nevertheless, it will be understood that various modifications may be made. For example, referring to FIG. 9, a damping member 100 may include biasing elements 102 that are used to radially bias the force-applying elements 104 toward their unloaded states. The biasing elements 102 may extend between the inner shoulder 42 of the hub 40 and the force applying elements 104. The biasing elements 102 may be, for example, springs or elastomeric members formed of a resiliently compressible material. In some embodiments, a high friction material 58 may be affixed about an inner surface of the compartment 38 such that the force-applying elements contact the high friction material. In some embodiments, the damping member, such as damping member 20 may be in sliding contact with the support housing 12, for example, by fixedly connecting the damping member to the pivot arm 14. Accordingly, other embodiments are within the scope of the following claims.

What is claimed is:

1. A belt tensioner comprising:
   a support housing at least in part defining a spring cavity;
   an arm pivotally attached to the support housing;
   a spring located in the spring cavity and operatively connected to the arm and the support housing to bias the arm about a pivot axis toward an unloaded position relative to the support housing; and
   a damping member comprising a hub and deflectable, force-applying elements that are connected to and spaced apart about a periphery of the hub, the force-applying elements being biased toward a contact surface of the arm to apply a frictional force between the contact surface and the force-applying elements to impede rotation of the arm relative to the support housing;
   wherein at least one of the force-applying elements is an elastically deflectable leaf spring that is self-biased against the contact surface of the arm.

2. The belt tensioner of claim 1, wherein the damping member provides asymmetric damping of the arm that depends on a direction of arm rotation relative to the support housing.

3. The belt tensioner of claim 1, wherein the force-applying elements are formed of material forming the hub.

4. The belt tensioner of claim 1, wherein the force-applying elements are formed separate from the hub and attached thereto.

5. The belt tensioner of claim 1 further comprising a friction material affixed to the force-applying elements, the friction material being in contact with the contact surface of the arm.

6. The belt tensioner of claim 1 further comprising a biasing member that biases the force-applying element toward the contact surface of the arm.

7. The belt tensioner of claim 1, wherein the force-applying elements include a free end and an opposite end fixed to the hub to define a respective pivot location.

8. The belt tensioner of claim 7, wherein the free ends of the force-applying elements are spaced substantially equidistant from each other about the periphery of the hub.

9. The belt tensioner of claim 1, wherein the force-applying elements are deflected toward the pivot axis of the arm relative to the hub.

10. A belt tensioner comprising:
    a support housing at least in part defining a spring cavity;
    an arm pivotally attached to the support housing;
    a spring located in the spring cavity and operatively connected to the arm and the support housing to bias the arm about a pivot axis toward an unloaded position relative to the support housing; and
    a damping member comprising an annular hub having a discontinuous shoulder extending downward therefrom, the discontinuous shoulder comprising an array of force-applying elements extending out from the shoulder, the force-applying elements being a leaf spring having a free end biased toward a contact surface of the arm such that a friction surface of the force-applying elements contact the contact surface to impede rotation of the arm relative of the support housing.

11. The belt tensioner of claim 10, wherein the damping member provides asymmetric damping of the arm that depends on a direction of arm rotation relative to the support housing.

12. The belt tensioner of claim 10, wherein the force-applying elements are formed of material forming the annular hub.

13. The belt tensioner of claim 10, wherein the force-applying elements are formed separate from the hub and attached thereto.

14. The belt tensioner of claim 10 further comprising a friction material affixed to the force-applying elements, the friction material being in contact with the contact surface of the arm.

15. The belt tensioner of claim 10 further comprising a biasing member that biases the free end of the force-applying element toward the contact surface of the arm.

16. The belt tensioner of claim 10, wherein the force-applying elements have an end opposite the free end that is fixed to the hub to define a respective pivot location.

17. The belt tensioner of claim 16, wherein the force-applying elements are deflected at their respective pivot location toward the pivot axis of the pivot arm.

18. The belt tensioner of claim 16, wherein the free ends of the force-applying elements are spaced substantially equidistant from each other about the periphery of the annular hub.

19. A method of forming a belt tensioner that utilizes asymmetric motion control and includes a support housing at least in part defining a spring cavity, an arm pivotally attached to the support housing and a spring located in the spring cavity and operatively connected to the arm and the support housing to bias the arm about a pivot axis toward an unloaded position relative to the support housing, the method comprising:

locating a damping member within a compartment of the arm, the damping member comprising an annular hub and deflectable, force-applying elements that are connected to and spaced apart about a periphery of the annular hub, the force-applying elements being biased toward a contact surface of the arm to apply a frictional force between the contact surface and the force-applying elements to impede rotation of the arm relative to the support housing;

wherein at least one of the force-applying elements is an elastically deflectable leaf spring that is self-biased against the contact surface of the arm; and fixing an angular position of the damping member relative to the support housing.

20. The method of claim 19, wherein the force-applying elements are biased in a radial direction toward the contact surface that is substantially perpendicular to the pivot axis of the pivot arm.

21. The method of claim 19 further comprising affixing a friction material to a surface of the force-applying elements, the friction material contacting the contact surface.

22. The method of claim 19 further comprising connecting the force-applying elements to the hub.

23. The method of claim 19 further comprising integrally forming the force-applying elements of material forming the hub.

24. The method of claim 19 further comprising biasing the force-applying elements toward the contact surface using a biasing element.

25. The method of claim 19 further comprising deflecting the force-applying elements in a radial direction toward the pivot axis of the pivot arm.

* * * * *